United States Patent
Champa et al.

(10) Patent No.: US 11,988,237 B2
(45) Date of Patent: May 21, 2024

(54) SYSTEM INCLUDING BREAKAWAY FASTENERS FOR FABRICATION OF COMPOSITE PARTS

(71) Applicant: SPIRIT AEROSYSTEMS, INC., Wichita, KS (US)

(72) Inventors: Michael Arthur Champa, Clearwater, KS (US); Matthew J. Nelson, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 897 days.

(21) Appl. No.: 16/944,441

(22) Filed: Jul. 31, 2020

(65) Prior Publication Data

US 2022/0034353 A1 Feb. 3, 2022

(51) Int. Cl.
*F16B 31/02* (2006.01)
*B29C 33/38* (2006.01)
*B29C 70/42* (2006.01)
*B29L 31/30* (2006.01)

(52) U.S. Cl.
CPC ............ *F16B 31/021* (2013.01); *B29C 33/38* (2013.01); *B29C 70/42* (2013.01); *B29L 2031/30* (2013.01)

(58) Field of Classification Search
CPC ..... F16B 31/021; B29C 33/20; B29C 33/448; B29C 2043/3261; B29C 66/81261; B29C 66/818; B29C 66/8185
See application file for complete search history.

(56) References Cited

U.S. PATENT DOCUMENTS

| | | | | |
|---|---|---|---|---|
| 2,367,822 A | * | 1/1945 | Brown | B29C 43/36 425/394 |
| 2,760,231 A | * | 8/1956 | St Clair | D21J 3/00 425/398 |
| 3,309,123 A | * | 3/1967 | Edwards | B29C 70/68 65/59.32 |
| 3,631,753 A | * | 1/1972 | Hall | B21D 28/04 83/648 |
| 3,955,418 A | * | 5/1976 | Hand | G01K 3/04 374/102 |
| 4,006,661 A | * | 2/1977 | Sims, Jr. | F16B 31/028 411/959 |
| 4,149,841 A | * | 4/1979 | Patterson | B29C 51/087 425/398 |

(Continued)

*Primary Examiner* — Andrew D Graham
(74) *Attorney, Agent, or Firm* — Stinson LLP

(57) ABSTRACT

A system including mold pieces coupled together with breakaway bolts or other fasteners for facilitating the fabrication of composite parts for, e.g., aerospace vehicles. First and second mold pieces are coupled together to form a mold within which the composite part is fabricated from a composite material. A coefficient of thermal expansion of the mold pieces is higher than a coefficient of thermal expansion of the composite part. One or more breakaway fasteners couple together the mold pieces while the mold pieces and the composite material are heated, and then purposefully break and thereby decouple the mold pieces and release the composite part when the mold pieces are cooled. The fasteners may be constructed from polytetrafluoroethylene, may include a structural weakness to ensure breakage, may break into two or more pieces when under a tension or a sheering force, or may include threads that sheer when under a tension force.

20 Claims, 4 Drawing Sheets

(56) References Cited

U.S. PATENT DOCUMENTS

| | | | | |
|---|---|---|---|---|
| 4,734,146 | A * | 3/1988 | Halcomb | B29C 69/003 52/840 |
| 4,961,700 | A * | 10/1990 | Dunbar | B29C 70/48 425/398 |
| 5,238,640 | A * | 8/1993 | Masui | B29C 45/14262 264/296 |
| 5,442,156 | A * | 8/1995 | Westerman | H05B 3/00 165/104.19 |
| 5,474,408 | A * | 12/1995 | Dinitz | F16B 31/021 411/389 |
| 5,728,309 | A * | 3/1998 | Matsen | B29C 65/3676 72/70 |
| 5,829,716 | A * | 11/1998 | Kirkwood | B29C 66/30341 244/119 |
| 5,938,383 | A * | 8/1999 | Dirmeier | F16B 31/021 411/513 |
| 6,042,430 | A * | 3/2000 | Hollick | F16B 31/021 439/814 |
| 6,146,122 | A * | 11/2000 | Kato | B29C 43/203 264/258 |
| 6,371,504 | B1 * | 4/2002 | Alguera Gallego | B62D 53/0885 280/433 |
| 7,943,075 | B2 * | 5/2011 | Kondo | B29C 70/545 156/181 |
| 10,605,290 | B1 * | 3/2020 | Roskwitalski | F16B 5/0266 |
| 2004/0202521 | A1 * | 10/2004 | Bostik | F16B 31/021 411/2 |
| 2008/0241296 | A1 * | 10/2008 | Wang | B29C 33/38 264/258 |
| 2013/0099418 | A1 * | 4/2013 | Li | B29C 33/485 264/301 |
| 2014/0147202 | A1 * | 5/2014 | Schieren | E01F 13/06 404/6 |
| 2014/0370140 | A1 * | 12/2014 | Chen | B29C 33/76 425/233 |
| 2015/0082605 | A1 * | 3/2015 | Batt | B21D 39/00 29/505 |
| 2015/0273774 | A1 * | 10/2015 | Stips | B29C 70/70 428/99 |
| 2015/0335404 | A1 * | 11/2015 | Webber | B29C 33/448 264/16 |
| 2015/0336299 | A1 * | 11/2015 | Tanugula | B29C 33/3835 264/16 |
| 2016/0046086 | A1 * | 2/2016 | Wenzel | B29C 51/32 425/298 |
| 2016/0052564 | A1 * | 2/2016 | Graefe | B62D 29/005 264/258 |
| 2016/0167314 | A1 * | 6/2016 | Ingram | B29C 43/36 264/325 |
| 2017/0136714 | A1 * | 5/2017 | Eschl | B29C 70/345 |
| 2017/0341318 | A1 * | 11/2017 | Von Koenigsegg | B29C 70/446 |
| 2019/0381751 | A1 * | 12/2019 | Matlack | B29C 70/443 |
| 2020/0130291 | A1 * | 4/2020 | Heath, III | B29C 37/005 |
| 2020/0166066 | A1 * | 5/2020 | Brennetot | F16B 23/0061 |
| 2020/0198263 | A1 * | 6/2020 | Sana | B29C 43/32 |
| 2020/0370579 | A1 * | 11/2020 | Zaffetti | F16B 5/025 |
| 2021/0170700 | A1 * | 6/2021 | Farver | B62K 19/16 |
| 2022/0034353 | A1 * | 2/2022 | Champa | B29C 70/42 |
| 2022/0402171 | A1 * | 12/2022 | Møller | F16B 2/10 |

\* cited by examiner

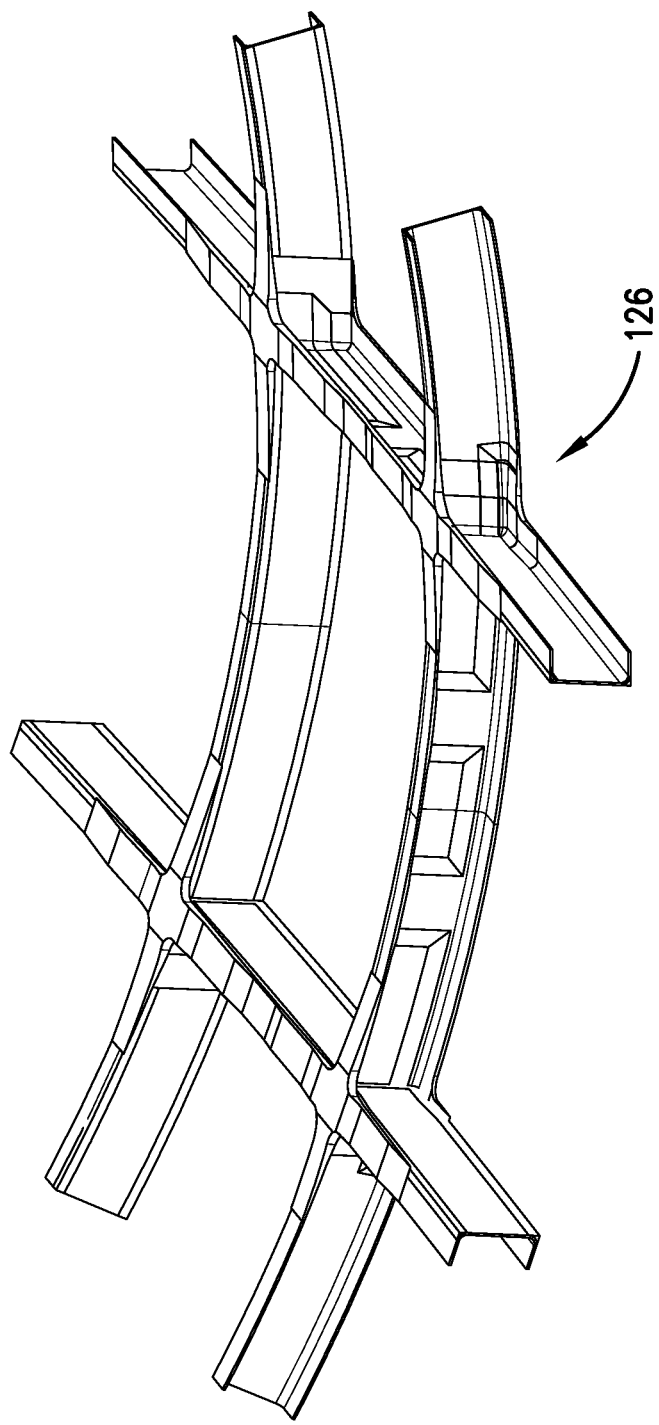

SYSTEM INCLUDING BREAKAWAY FASTENERS FOR FABRICATION OF COMPOSITE PARTS

FIELD

The present invention concerns systems and methods for fabricating composite parts, and more particularly, embodiments concern a system including mold pieces coupled together with breakaway bolts or other fasteners for facilitating the fabrication of composite parts.

BACKGROUND

Composite parts, such as certain components of aerospace or other vehicles, may be fabricated in molds (also referred to as "tooling"). Such a mold is assembled from a plurality of mold pieces which are coupled together by bolts. A composite material is placed within the mold, and the mold and the material are heated to a curing temperature and then cooled. During cooling, if the mold pieces are made of a material which has a higher coefficient of thermal expansion (CTE) than the composite part, the greater contraction of the mold pieces may damage the pieces or the composite part. One solution is to loosen the bolts during cooling, but this can be difficult. Another solution is to use mold pieces made of a material, such as the thermosetting polymer bismaleimide (BME) or the nickel-iron alloy Invar, which have the same or a lower CTE than the composite part, but this is very costly.

This background discussion is intended to provide information related to the present invention which is not necessarily prior art.

SUMMARY

Embodiments of the present invention address the above-described problems and limitations by providing a system including mold pieces coupled together with breakaway bolts or other fasteners for facilitating the fabrication of composite parts. The mold pieces has a higher coefficient of thermal expansion than the composite part, such that when the mold and the composite material are heated during curing and then cooled, the mold pieces contract more than the composite part. This differential contraction exerts a tension or sheering force on the breakaway fasteners which causes them to break and thereby decouple the mold pieces to facilitate removal of the composite part.

In a first embodiment, a system may be provided for fabricating a composite part, and may include first and second mold pieces and one or more breakaway fasteners. The first and second mold pieces may be coupled together to form a mold within which the composite part is fabricated from a composite material, wherein a CTE of the first and second mold pieces may be higher than a CTE of the composite part. The one or more breakaway fasteners may couple together the first and second mold pieces while the first and second mold pieces and the composite material are heated, and then purposefully break and thereby decouple the first and second mold pieces and release the composite part when the first and second mold pieces are cooled.

Various implementations of the first embodiment may include any one or more of the following features. The first and second mold pieces may be constructed from a material including aluminum. The one or more breakaway fasteners may be constructed from a material including polytetrafluoroethylene. Each of the one or more breakaway fasteners may include one or more threaded portions and one or more nuts, and the nuts may be constructed from a material including Teflon. At least some of the one or more breakaway fasteners may include a structural weakness to ensure breakage. The composite material may include dry fibers and resin, and the first and second mold pieces and the composite material may be heated to a temperature of approximately between three hundred fifty and four hundred degrees Fahrenheit. The one or more breakaway fasteners may break into two or more pieces when under a tension force, the fasteners may include threads and the threads may sheer when under a tension force, or the fasteners may break into two or more pieces when under a sheering force.

In a second embodiment, a system may be provided for fabricating a composite part of an aerospace vehicle, and may include a plurality of mold pieces and a plurality of breakaway fasteners. The plurality of mold pieces may be constructed from a material including aluminum and may be coupled together to form an external mold within which the composite part is fabricated from composite material which includes dry fibers and resin. A CTE of the plurality of mold pieces may be higher than a CTE of the composite part. The plurality of breakaway fasteners may be constructed from a material including polytetrafluoroethylene and may couple together two or more of the mold pieces of the plurality of mold pieces while the plurality of mold pieces and the composite material are heated to a temperature of approximately between three hundred fifty and four hundred degrees Fahrenheit, and then purposefully break and thereby decouple the two or more mold pieces and release the composite part when the plurality of mold pieces are cooled.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 7 is an isometric view of the example composite part of FIG. 5 fabricated using the mold of FIG. 6.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, embodiments provide a system including mold or tooling pieces coupled together with breakaway bolts or other fasteners for facilitating the fabrication of composite parts. The mold pieces have a higher coefficient of thermal expansion than the composite part, such that when the mold and composite material are heated during curing and then cooled, the mold pieces contract more than the composite part. This differential contraction exerts a tension or sheering force on the breakaway fasteners which causes them to break and thereby decouple the mold pieces to facilitate removal of the composite part. As used herein, the terms "mold" and "tooling" shall be interchangeable.

Embodiments provide advantages over the prior art, including allowing for using a significantly less expensive mold material (e.g., aluminum) than BME or Invar, while harnessing the CTE differential between the mold material and the composite part to assist in releasing the composite part from the mold. Potential applications include the fabrication of substantially any composite part using a multi-piece mold which at least partially encloses at least a perimeter of the composite part.

Figure 1:
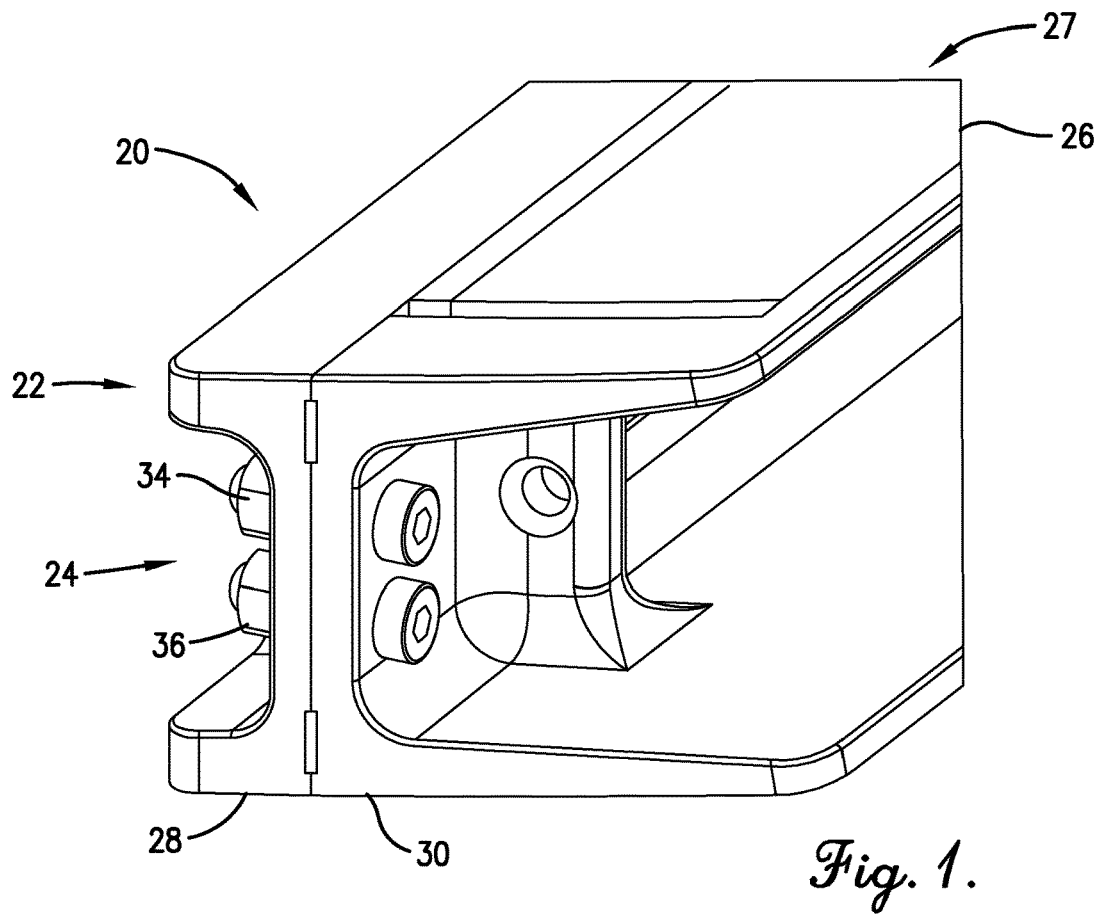
FIG. 1 is a fragmentary isometric view of an embodiment of a system including mold pieces coupled together with breakaway fasteners for facilitating the fabrication of a composite part.

Referring to FIG. 1, an embodiment of a system 20 is shown including mold pieces 22 and breakaway fasteners 24 for facilitating the fabrication of a composite part 26. The composite part 26 may be fabricated from a composite material 27, which may include dry fibers and resin, and the mold pieces 22 and the composite material 27 may be heated to a temperature of approximately between three hundred fifty and four hundred degrees Fahrenheit, or approximately three hundred seventy-five degrees Fahrenheit, in order to cure the composite material 27 and produce the composite part 26.

First and second mold pieces 28,30 of a plurality of the mold pieces 22 may be configured to be coupled together to form a mold within which the composite part 26 is fabricated from the composite material 27. The assembled mold pieces 22 may partially or fully enclose and thereby define at least a perimeter of the composite part 26, and may form substantially any simple- or complex-shaped mold which would benefit from the use of the present invention. The mold pieces 22 may be constructed of substantially any suitable material, such as aluminum or other metal, such that a CTE of the mold pieces 22 is higher than a CTE of the composite part 26.

Figure 2:
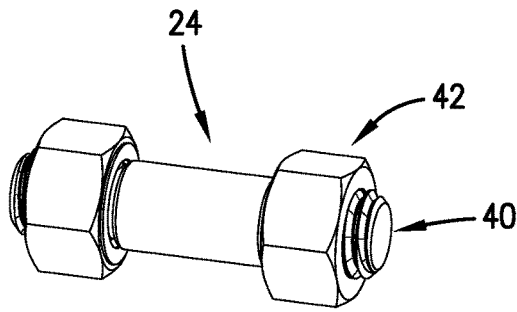
FIG. 2 is a perspective view of an example fastener of the system of FIG. 1, wherein the fastener is manufactured to purposefully break and thereby decouple the mold pieces.
Figure 3:
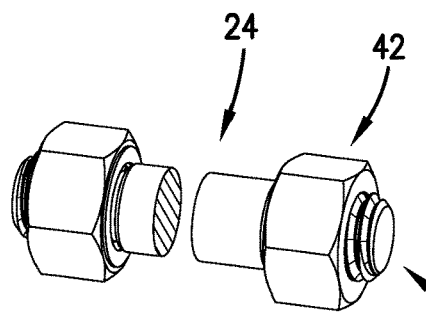
FIG. 3 is a perspective view of the example fastener of the system of FIG. 2, wherein the fastener is shown broken.
Figure 4:
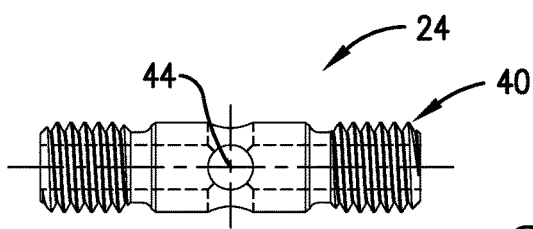
FIG. 4 is an elevation view of an example fastener of the system of FIG. 2, wherein a structural weakness has been manufactured in the fastener to ensure breakage.

Referring also to FIGS. 2-4, one or more breakaway fasteners 34,36 of a plurality of the breakaway fasteners 24 may be configured to couple together the first and second mold pieces 28,30 while the mold pieces 22 and the composite material 27 are heated, and configured to purposefully break and thereby decouple the mold pieces 22 and release the composite part 26 when the mold pieces 22 and the composite part 26 are cooled. In various implementations, the system 20 may employ only breakaway fasteners or a combination of breakaway and non-breakaway fasteners, depending on the design of the mold or other relevant considerations. The breakaway fasteners 24 may incorporate substantially any suitable fastening technology, take substantially any suitable form, such as threaded rods or tubes and nuts, threaded bolts and nuts, pins and snap rings, and/or pins and wedges, and have substantially any desired or needed dimensions. Further, the fasteners may be constructed of substantially any suitable material, such as chemical-resistant slippery polytetrafluoroethylene (PTFE), glass-filled chemical-resistant slippery PTFE, or wear-impact chemical-resistant PTFE. In one implementation, different breakaway fasteners incorporating different fastening technologies and/or constructed of different materials may be used.

In one implementation, seen in FIG. 2, some or all of the breakaway fasteners may include one or more threaded end portions 40 and one or more nuts 42. The nuts 42 may be constructed of substantially any suitable material, such as Teflon. As seen in FIG. 3, the breakaway fasteners 24 may be configured to break into two or more pieces, with the result being the decoupling of the mold pieces 28,30. In various implementations, some or all of the breakaway fasteners 24 may be designed to break into two or more pieces when under tension forces, some or all of the breakaway fasteners 24 may be designed such that their threads sheer when under tension forces, or some or all of the breakaway fasteners 24 may be designed to break into two or more pieces when under sheering forces. In one implementation, seen in FIG. 4, some or all of the breakaway fasteners 24 may include a structural weakness 44, such as one or more holes drilled through a central region of the fastener or one or more grooves cut into the central region, which may be physically machined, molded into, or otherwise formed in the fastener to ensure breakage.

Figure 5:
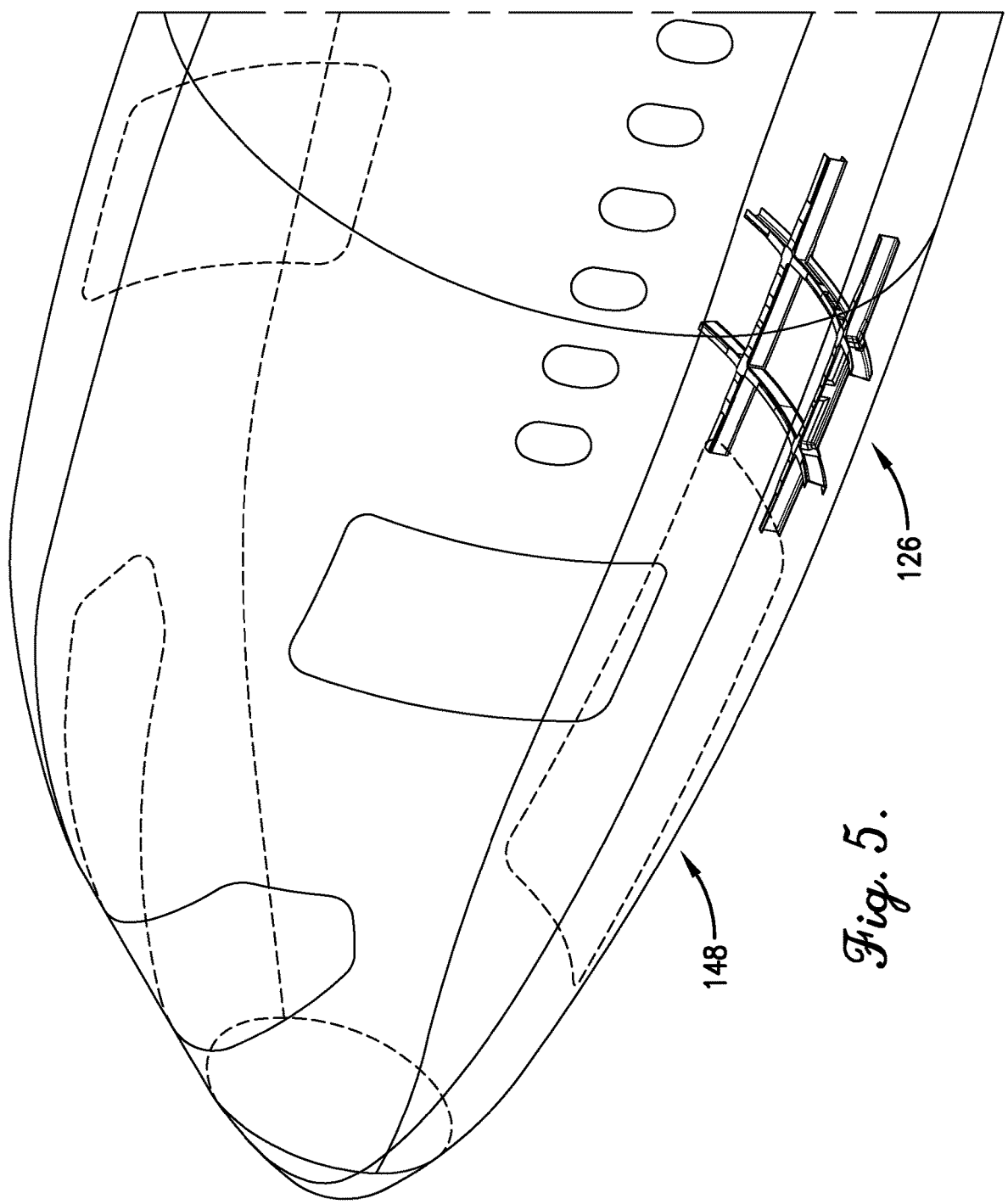
FIG. 5 is an isometric view of an example composite part shown incorporated into an example aerospace vehicle (shown in broken line)
Figure 6:
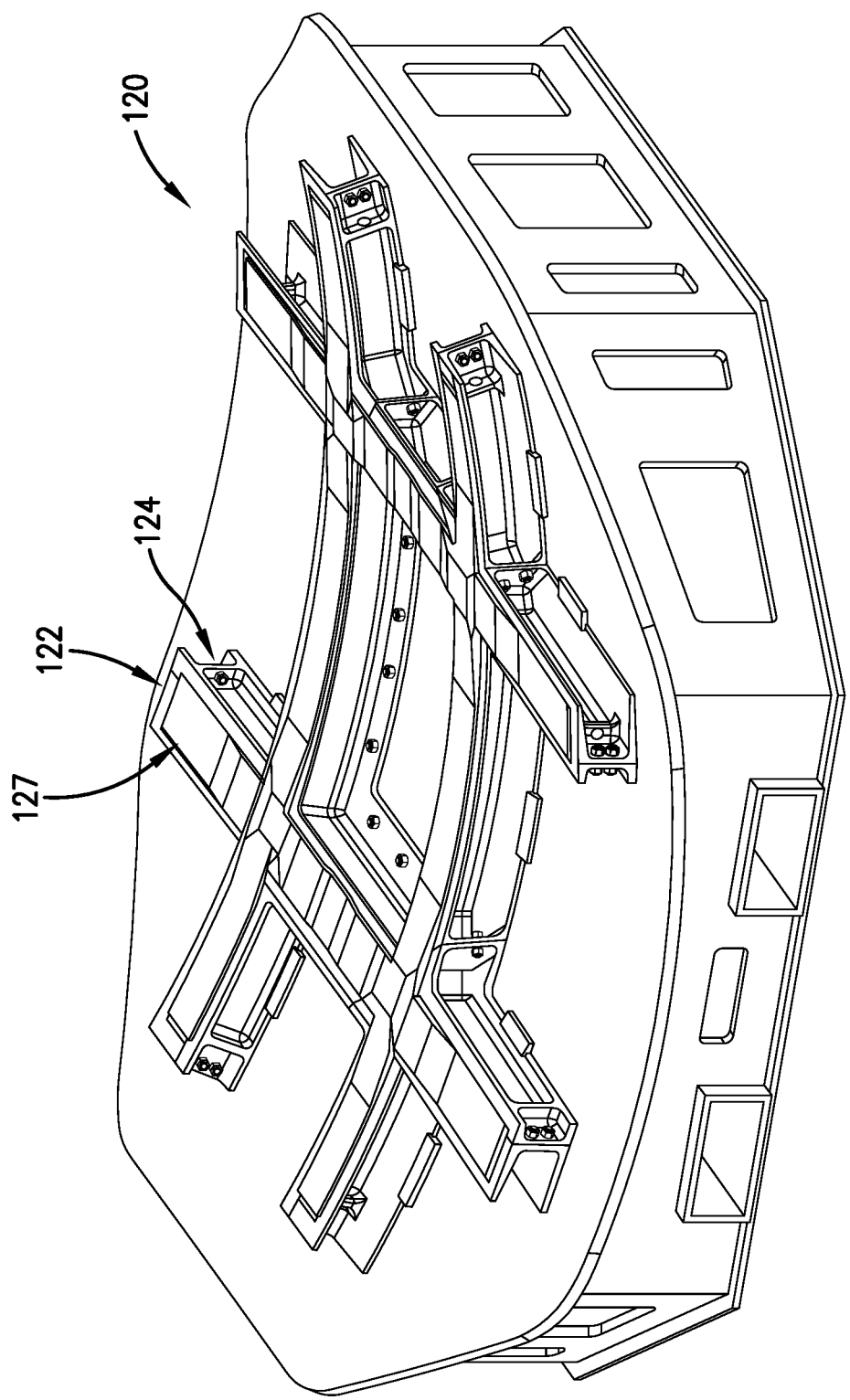
FIG. 6 is an isometric view of an example implementation of the system of FIG. 1 including a plurality of mold pieces coupled together with a plurality of breakaway fasteners for facilitating the fabrication of the example composite part of FIG. 5.

Referring also to FIGS. 5-7, in exemplary use, an implementation of the system 120 may be employed and function substantially as follows to produce a composite part 126, such as a door or window surround, for an aerospace or other vehicle 148 (as seen in FIG. 5). A plurality of mold pieces 122 may be coupled together to form a mold which encloses a perimeter of the composite material 127, as seen in FIG. 6, and thereby defines a perimeter of the composite part 126. The CTE differential between the mold pieces 122 and the composite part 126 may be sufficiently large that the mold pieces 122 at room temperature may be accordingly scaled. Non-breakaway fasteners may initially be used to set the mold pieces 122 and compact the fiber of the composite material 127. Between a compaction process, which may involve vacuum bagging, and a resin infusion process, in which resin is introduced to the dry fibers contained within the mold, some or all of the non-breakaway fasteners may be replaced with breakaway fasteners 124.

During a curing process, the mold and the composite material 127 may be heated to a temperature of approximately between three hundred fifty and four hundred degrees Fahrenheit, or approximately three hundred seventy-five degrees Fahrenheit, to cure the composite material 127 and thereby produce the composite part 126 (seen in FIG. 7). This heating may cause the mold pieces 122 to expand (e.g., aluminum pieces may expand approximately one-eighth inch), and the composite material 127 may fill the expanded space as the resin infuses into the dry fibers and cures.

During the subsequent cooling to room temperature, the mold pieces 122 may contract (e.g., aluminum pieces may contract the same approximately one-eighth inch), while the composite part 126, having a lower CTE, may contract less than the surrounding mold pieces 122. The resulting force exerted by the composite part 126 on the contracting mold may cause the breakaway fasteners 124 to break in tension or in sheer, thereby decoupling the pieces 122 of the mold and releasing or facilitating release of the composite part 126 from the mold.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for fabricating a composite part, the system comprising:
   first and second mold pieces coupled together to form a mold within which the composite part is fabricated from a composite material, wherein a coefficient of thermal expansion of the first and second mold pieces is higher than a coefficient of thermal expansion of the composite part; and
   one or more breakaway fasteners each extending through both the first and second mold pieces and coupling together the first and second mold pieces while the first and second mold pieces and the composite material are heated, wherein the one or more breakaway fasteners are shearable into at least two pieces during cooling following application of curing heat due to the composite part contracting slower during cooling than the first and second mold pieces, thereby decoupling the first and second mold pieces and releasing the composite part when the first and second mold pieces are cooled.

2. The system of claim 1, wherein the first and second mold pieces are constructed from a material comprising aluminum.

3. The system of claim 1, wherein the one or more breakaway fasteners are entirely constructed from a material comprising polytetrafluoroethylene.

4. The system of claim 1, wherein each of the one or more breakaway fasteners comprise one or more threaded portions and one or more nuts.

5. The system of claim 4, wherein the one or more nuts are constructed from a material comprising polytetrafluoroethylene.

6. The system of claim 1, wherein at least some of the one or more breakaway fasteners comprise a structural weakness to ensure breakage, wherein the structural weakness is one or more holes drilled through a central region of the one or more breakaway fasteners or one or more grooves cut into the central region of the one or more breakaway fasteners.

7. The system of claim 1, wherein the composite material comprises dry fibers and resin, and the first and second mold pieces and the composite material are heated to a temperature of between three hundred fifty and four hundred degrees Fahrenheit.

8. The system of claim 1, wherein the one or more breakaway fasteners break into two or more pieces when under a tension force.

9. The system of claim 1, wherein the one or more breakaway fasteners comprise threads, and the threads shear when under a tension force.

10. The system of claim 1, wherein the one or more breakaway fasteners break into two or more pieces when under a shearing force.

11. A system for fabricating a composite part, the system comprising:
    a plurality of mold pieces coupled together to form an external mold within which the composite part is fabricated from a composite material;
    the composite material placed into the external mold to fabricate the composite part, wherein the composite material comprises dry fibers and resin, wherein a coefficient of thermal expansion of the plurality of mold pieces is higher than a coefficient of thermal expansion of the composite part; and
    a plurality of breakaway fasteners each extending through two or more of the mold pieces and coupling together two or more of the mold pieces of the plurality of mold pieces, wherein at least some of the plurality of breakaway fasteners comprise a structural weakness where breakage occurs during cooling following application of curing heat due to the composite part contracting slower during cooling than the plurality of mold pieces, wherein the structural weakness is one or more holes drilled through a central region of the one or more breakaway fasteners or one or more grooves cut into the central region of the one or more breakaway fasteners.

12. The system of claim 11, wherein the plurality of mold pieces are constructed from a material comprising aluminum.

13. The system of claim 11, wherein the plurality of breakaway fasteners are entirely constructed from a material comprising polytetrafluoroethylene.

14. The system of claim 11, wherein each of the plurality of breakaway fasteners comprise one or more threaded portions and one or more nuts, and the one or more nuts are constructed from a material comprising polytetrafluoroethylene.

15. The system of claim 11, wherein the composite material is curable at a temperature of between three hundred fifty and four hundred degrees Fahrenheit.

16. The system of claim 11, wherein the plurality of breakaway fasteners are configured to break into two or more pieces when under a tension force.

17. The system of claim 11, wherein at least some of the plurality of breakaway fasteners comprise threads, and the threads shear when under a tension force.

18. The system of claim 11, wherein at least some of the plurality of breakaway fasteners break into two or more pieces when under a shearing force.

19. A method for fabricating a composite part of an aerospace vehicle from the system of claim 2, the method comprising:
    coupling a plurality of the first and second mold pieces together to form an external mold within which the composite part is fabricated, wherein the coupling is performed by the one or more breakaway fasteners constructed, wherein the one or more breakaway fasteners are constructed from a material comprising polytetrafluoroethylene;

placing the composite material into the external mold to fabricate the composite part, wherein the composite material comprises dry fibers and resin; and heating the plurality of mold pieces and the composite material to a curing temperature; and cooling the plurality of mold pieces and the composite material once the composite material is cured into the composite part, wherein the cooling includes breaking the breakaway fasteners via shearing force into two or more segments via the composite part contracting slower during cooling than the two or more mold pieces, thereby decoupling the two or more mold pieces and releasing the composite part when the plurality of mold pieces are cooled.

20. The method of claim 19, wherein at least some of the plurality of breakaway fasteners comprise a structural weakness to ensure breakage, wherein the structural weakness is one or more holes drilled through a central region of at least some of the plurality of breakaway fasteners or one or more grooves cut into the central region of at least some of the plurality of breakaway fasteners.

\* \* \* \* \*